United States Patent [19]

Weber et al.

[11] Patent Number: 4,604,773

[45] Date of Patent: Aug. 12, 1986

[54] AUTOMOBILE SEAT BELT TIGHTENER FOR USE WITH CHILD SAFETY SEATS

[75] Inventors: Kathleen Weber, Ann Arbor; Joseph B. Benson, South Lyon, both of Mich.

[73] Assignee: The Regents of the University of Michigan, Ann Arbor, Mich.

[21] Appl. No.: 757,795

[22] Filed: Jul. 22, 1985

[51] Int. Cl.$^4$ .................. A44B 21/00; F16L 33/14
[52] U.S. Cl. .................. 24/71.2; 24/68 BT; 24/269
[58] Field of Search .......... 24/269, 71.2, 71.3, 24/68 R, 68 CD, 68 BT, 69 CT

[56] References Cited

U.S. PATENT DOCUMENTS

| 620,529 | 2/1899 | Andre | 24/71.2 |
|---|---|---|---|
| 1,467,860 | 9/1923 | Lampert | 24/269 |
| 1,467,943 | 9/1923 | Lampert | 24/269 |
| 1,494,791 | 5/1924 | Lampert | 24/269 |
| 1,736,848 | 11/1929 | Dickinson | 24/71.2 |
| 1,874,731 | 8/1982 | Younce | 24/269 |
| 1,963,436 | 6/1934 | Dumke | 24/269 |
| 2,642,639 | 6/1953 | Meighan et al. | 24/71.2 |
| 3,826,473 | 7/1974 | Huber | 24/71.2 |
| 3,988,007 | 10/1976 | Freiburger, Jr. | 24/269 |
| 4,324,023 | 4/1982 | Prete, Jr. | 24/68 BT |

Primary Examiner—Victor N. Sakran
Attorney, Agent, or Firm—James M. Deimen; James Dautremont

[57] ABSTRACT

A manual two part automobile seat belt tightener which conveniently assembles and disassembles to permit intermediate attachment to a seat belt without the need to pass any of the seat belt buckle parts through the tightening mechanism. The tightener mechanism includes a non-circular bifurcated pin or reel and a complimentary non-circular aperture in the tightener frame to assure that the pin or reel cannot be rotated until the pin or reel is fully inserted in the frame. In particular, in attaching the tightener to an intermediate portion of an automobile seat belt, the tightener ratcheting mechanism cannot be rotated unless the bifurcated pin or reel is fully inserted into the ratcheting mechanism. An additional advantage to the new tightener is the significantly simple and sturdy construction that can make use of a conventional hexagonal ratchet wrench mechanism in the novel combination.

6 Claims, 2 Drawing Figures

AUTOMOBILE SEAT BELT TIGHTENER FOR USE WITH CHILD SAFETY SEATS

BACKGROUND OF THE INVENTION

The field of the invention pertains to the secure anchorage of child safety seats (CSS), which are held in place in an automobile by the conventional seat belt. In particular, the invention pertains to a convenient and effective means to securely tighten the automotive seat belt about the frame or primary structure of the child safety seat to restrain the seat in the automobile. In this particular embodiment, the automobile seat belt is not used to restrain the child in the CSS, because the CSS comes equipped with a separate harness or other restraining system for the child.

Numerous means have been invented to tighten fabric or metal straps wrapped about one or more objects. These devices come in the form of clamping means or tightening and adjusting means with a mechanical assembly that engages a portion of the strap or, alternatively, two separate portions of the strap. Most of these devices, however, require that at least one end of the strap be passed through the device after the device is attached to another portion of the strap. U.S. Pat. Nos. 1,963,436 and 4,388,748 each disclose clamps that are affixed to one end of the strap and reel up the other end of the strap to clamp and tighten the strap about some object. Both of these references disclose a bifurcated pin through which the strap is passed and which may be rotated to reel up the loose end of the strap thereby tightening the strap. A latching or ratcheting means is provided to prevent the strap from loosening from the tightened position. In both cases the clamp is completely assembled and the loose end of the strap inserted through the slot in the bifurcated pin or reel.

U.S. Pat. No. 4,324,023 also discloses a bifurcated reel in a ratchet buckle for a seat belt, and U.S. Pat. No. 3,826,473 discloses a strap tightener that may be positioned at any intermediate location along a strap. The latter includes a bifurcated reel for rolling up the strap and a ratcheting mechanism for retaining the tightened position. Both of these references also require that the seat belt or strap be attached to the reel by passing one end of the seat belt through the bifurcated slot. The tightening or clamping means is completely assembled and operational before the end of the strap must be passed through the bifurcated slot and the reel turned to tighten.

Conventional automobile seat belts are equipped with a tightening an/or retracting device on at least one of the two belt halves. These can be either manual or automatic. In modern seat belts, the automatic retracting devices are normally mounted on the floor of the car and include a ratcheting or emergency inertia locking mechanism. A buckle attaches the two halves of the belt about a person or the frame of a child safety seat. Seat belts without the automatic retracting device include a manual tightening mechanism incorporated in the buckle. Unfortunately, with all three seat belt mechanisms, it is very difficult to fully tighten the seat belt about a child safety seat frame to assure that the seat is firmly anchored to the vehicle. The automatic ratcheting mechanism is purposely difficult to fully tighten, thereby providing some measure of comfort to the adult wearer. The inertia locking mechanism provides no tightening except under emergency conditions; thus, the child safety seat may shift out of position further loosening the belt during normal driving manuevers. The manual buckle tightening mechanism may find itself located underneath the child safety seat, and thus be inaccessible or awkward to manipulate.

The devices illustrated in the prior art above all require that one end of the seat belt or strap be passed through the bifurcated slot of the pin. With the buckle parts on each end of an automotive seat belt, neither end can be passed through such a bifurcated pin. Thus, such devices are not suitable for final tightening of an automobile seat belt.

SUMMARY OF THE INVENTION

The invention comprises a manual automobile seat belt tightener which assembles and disassembles to permit intermediate attachment to a seat belt without passing any of the buckle parts through the tightening mechanism. The mechanism includes a bifurcated pin or reel with means to assure that the pin or reel cannot be rotated until firmly assembled. Thus, in attaching the reel to an intermediate portion of an automobile seat belt, the ratcheting mechanism cannot be rotated unless the bifurcated pin or reel is fully engaged and assembled to the ratcheting mechanism. An additional advantage to the new seat belt tightener is the significantly simple sturdy construction in comparison with the generally more complicated structures disclosed in the prior art.

DESCRIPTION OF THE PREFERRED EMBODIMENT

Figure 1:
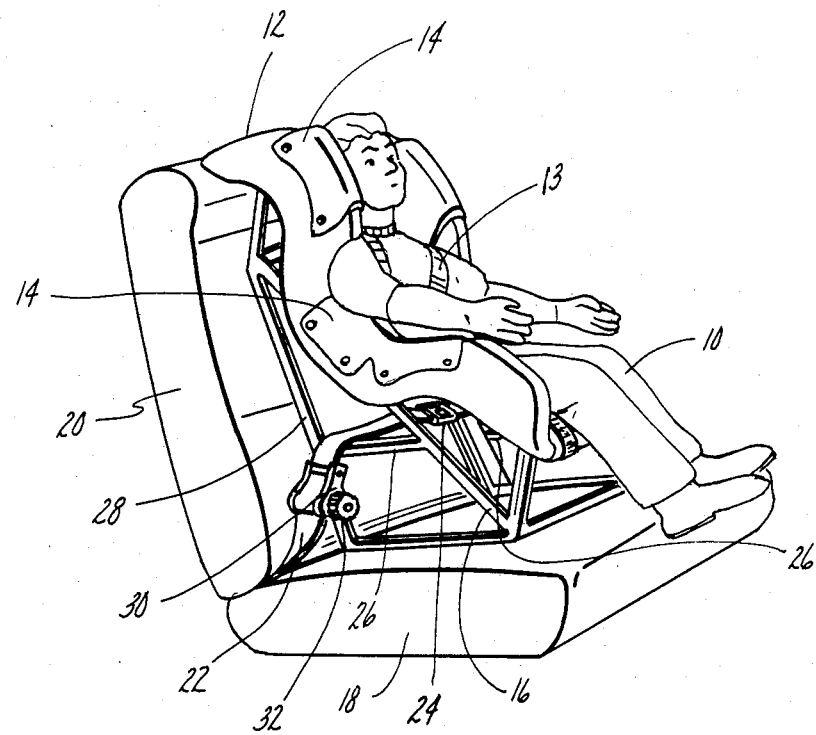
FIG. 1 illustrates in perspective a child safety seat located on an automobile seat with the automobile seat belt attached about the frame of the child safety seat and the new automobile seat belt tightener fully engaged.

In FIG. 1 a child 10 is illustrated sitting in the shell 12 and harnessed to the frame 16 of a child safety seat for automobile use. The shell portion 12 is typically molded of plastic with suitable padding 14 attached thereto for the comfort of the child. Supporting the molded shell 12 is a rigid framework 16 to which the molded shell and the harness straps 13 restraining the child are firmly attached. The framework 16 in turn rests upon the bottom 18 and back 20 of an automobile seat. The automobile seat in turn is affixed to the body and frame of the automobile in conventional fashion and is therefore not shown. Extending in typical fashion from between the bottom 18 and back 20 of the automobile seat is a seat belt 22 with a buckle 24 generally underneath the molded seat portion 12 or toward one side of the child safety seat. On most automobile seats the location of the buckle is predetermined because the length of one side of the seat belt is not adjustable, the adjustment being accomplished by either a manual belt tightening mechanism in the buckle, an automatic ratcheting tightener, or an emergency inertia locking mechanism adjacent the floor on the other side of the seat. The manually tightened buckle will frequently be located underneath the child safety seat in a location awkward for fully tightening the seat belt. With the ratcheting or inertia locking mechanisms, proper tightening cannot be guaranteed.

If the seat belt can be fully tightened and therefore the child safety seat tightly anchored to the vehicle, the load path through the automobile seat belt 22, through the frame 16, to the harness 13, prevents the restrained child from moving too far forward despite the sudden impact of an automobile collision. As shown, the seat belt 22 passes over specific frame members 26 on each side of the child safety seat and substantially parallel to the seat bottom 18. The belt 22 is adjacent frame members 28 on each side of the child safety seat. To assure that the seat belt can be fully tightened, the new seat belt tightener denoted by 30 in FIG. 1 is shown attached to the seat belt 22 adjacent the frame members 26 and 28 on one side. In this position the handle 32 of the seat belt tightener 30 can be rotated to fully tighten the belt 22 down against the frame members 26 thereby assuring that the entire child safety seat is properly anchored to the vehicle. The seat belt tightener 30 fully tightens the belt 22 against the manual belt tightener or the ratcheting tightener. With the emergency inertia locking mechanism, the seat belt tightener 30 is fully rotated to fully extend the belt. The child safety seat cannot become dislodged in a forward or sideways direction to any appreciable extent in the event of a collision nor can the child safety seat come out of the seat belt in the event of a rollover of the vehicle.

Figure 2:
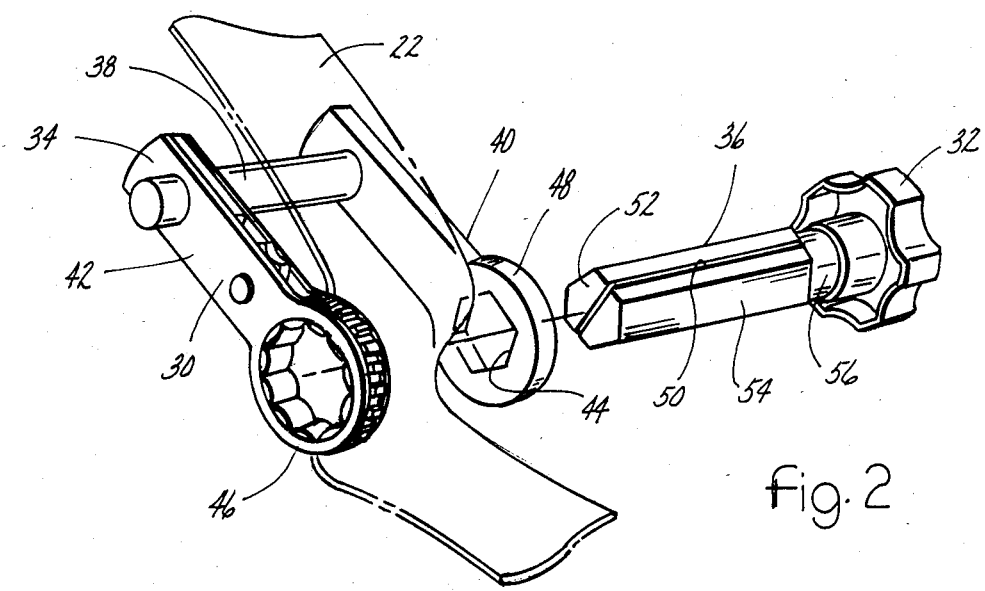
FIG. 2 illustrates in exploded view, the attachment of the tightener to an intermediate portion of the seat belt.

In FIG. 2 is shown the two major elements of the seat belt tightener 30 and a portion of the seat belt 22. The seat belt tightener 30 comprises two separate parts, a generally U-shaped portion or frame 34 and a separate bifurcated pin or reel 36. The frame 34 of the tightener comprises a cross pin 38 over which the belt 22 passes and which the belt bears upon when the seat belt tightener is tightened. Welded or otherwise permanently affixed to the cross pin 38 are two side portions 40 and 42. Side portion 40 extends from the cross pin 38 to an enlarged portion 48 spaced therefrom and having an aperture 44 of hexagonal shape therethrough. The other side portion 42 is also permanently affixed to the cross pin 38 and extends parallel to side portion 40 terminating in an enlarged portion 46 opposite and axially aligned with the enlarged end and hexagonal aperture of side portion 40. The enlarged end 46 of side portion 42 contains a hexagonal socket therein and a ratchet mechanism that can selectably ratchet in either rotational direction. A very inexpensive means of providing the ratchet and socket end 46 as well as the side portion 42 is to utilize a hexagonal socket wrench end of conventional manufacture.

The bifurcated pin or reel 36 includes a slot 50 extending therethrough from the end 52 of the reel opposite the handle 32. The hexagonal section 54 of the reel 36 extends the better portion of the length of the reel as shown. The hexagonal section 54, however, is spaced from the handle by a circular or cylindrical section 56 of a diameter equal or less than the distance between parallel flats of the hexagonal section 54.

As shown in FIG. 2 the bifurcated pin or reel 36 is inserted through the hexagonal aperture 44 which is sized to permit the convenient passage therethrough of the hexagonal shape 54 of the pin 36. The belt 22 is inserted through the bifurcation 50 as the pin 36 passes on toward the hexagonal socket end 46. The pin 36 cannot be rotated until the end 52 fully engages the hexagonal socket in the ratchet end 46 because the length of the hexagonal section 54 is sized to engage the aperture 44 unless the end 52 is fully inserted in the hexagonal socket of the ratchet end 46. With full insertion of the end 52, the cylindrical portion 56 of the pin 65 is positioned within the aperture 44. The handle 32 and pin 36 may then be turned to roll up the belt 22 thereby shortening and tightening the belt.

The belt 22 cannot be rolled up and shortened unless the pin and reel 36 is fully engaged in the belt tightener frame 34. The belt tightener 30 can be placed at any convenient location along the fabric portion of the belt 22. The belt tightener is simple to operate and simple to attach to the belt. The tightener does not require that the end of the belt be threaded through the pin or reel. More importantly, the belt tightener is inoperative unless the pin or reel 36 is fully engaged with the belt 22 and the socket in the ratchet end 46. Because the belt tightener 30 can be positioned in any location on the fabric portion of the belt 22, the tightener is also applicable to child restraint seats with enclosed frameworks or of completely molded plastic construction wherein the molded seat body includes apertures for the seat belt to be passed through and fastened.

We claim:

1. A belt tightening mechanism comprising a generally U-shaped frame, said frame comprising a cross pin and two parallel side portions rigidly affixed thereto, a non-circular aperture extending through one side portion and spaced from the cross pin, a selectably reversible ratchet mechanism on the other side portion, said ratchet mechanism having a socket therein of non-circular configuration substantially identical to the aperture and similarly spaced from the cross pin, a bifurcated reel having a non-circular exterior complementary to the aperture and extending for substantially the length of the reel, said bifurcation extending through one end of the reel and a handle at the other end of the reel, said handle spaced from the non-circular exterior of the reel by a circular exterior portion of the reel, whereby said reel must be inserted through the aperture and sufficiently into the socket to engage the circular portion of the reel with the aperture.

2. The belt tightening mechanism of claim 1 wherein the non-circular reel exterior, aperture and socket are hexagonal.

3. The belt tightening mechanism of claim 1 wherein the non-circular reel exterior and the bifurcation extend at least the distance between the aperture and the socket opening.

4. An automobile seat belt tightening mechanism comprising a generally U-shaped frame, said frame comprising a cross pin and two side portions rigidly affixed to the cross pin, a non-circular aperture extending through one side portion and spaced from the cross pin, a ratchet mechanism on the other side portion, said ratchet mechanism having a rotatable socket axially aligned with the aperture and of a non-circular configuration, a bifurcated reel having a non-circular exterior complementary to the aperture and extending substantially the length of the reel, said bifurcation extending through one end of the reel and a handle at the other end of the reel, said handle spaced from the non-circular exterior of the reel by a circular exterior portion of the reel, and said reel being insertable through the aperture and into the socket to enable the circular portion of the reel to fully engage the aperture.

5. The seat belt tightening mechanism of claim 4 wherein the non-circular aperture and reel exterior are hexagonal.

6. The seat belt tightening mechanism of claim 4 wherein the non-circular reel exterior extends at least the distance between the aperture and the socket opening.

* * * * *